B. J. DRYER.
SHOCK ABSORBER.
APPLICATION FILED MAY 8, 1915.

1,169,625.

Patented Jan. 25, 1916.

WITNESSES
George L. Blume.
C. Bradway

INVENTOR
B. J. Dryer.
BY Munn & Co.
ATTORNEYS

UNITED STATES PATENT OFFICE.

BENJAMIN JAMES DRYER, OF NEW YORK, N. Y.

SHOCK-ABSORBER.

1,169,625.  Specification of Letters Patent.  Patented Jan. 25, 1916.

Application filed May 3, 1915. Serial No. 26,736.

*To all whom it may concern:*

Be it known that I, BENJAMIN J. DRYER, a citizen of the United States, and a resident of the city of New York, borough of Manhattan, in the county and State of New York, have invented a new and Improved Shock-Absorber, of which the following is a full, clear, and exact description.

This invention relates to shock absorbers for vehicles and has to deal more particularly with the combined hydraulic and pneumatic shock absorbing devices and is adapted to be interposed between the vehicle body and its supporting springs.

The invention has for its general objects to improve and simplify the construction of devices of the character referred to so as to be reliable and efficient in use, comparatively easy and inexpensive to manufacture and keep in operative condition, and so designed as to produce an exceedingly efficient cushioning action, whereby shocks are effectively absorbed and easy running of the vehicle body secured.

A further object of the invention is the provision of a shock absorber including relatively slidable parts between which the retarding or cushioning medium, such as oil or other fluid, acts, the oil being contained in a multicellular resilient sack which is longitudinally compressed during the absorption of the shock, and out of the sack the oil escapes through valve-controlled ports into the pneumatic chamber that contains air under pressure, whereby co-action of the pneumatic and hydraulic media effectively absorbs shocks and prevents the same from being transmitted to the vehicle body.

A further object of the invention is to provide means for the hydraulic container, whereby the same will not expand into contact with the cylinder in which it is arranged, so that free longitudinal contraction and expansion of the sack is permitted.

Another object of the invention is the provision of a pneumatic inflating means which serves as a device for adjusting the tension of the spring that controls the ports through which the hydraulic medium passes.

Still another object is to adjustably mount the shock absorber on the attached bracket or arm on the vehicle body so that the shock absorber can be set in the proper position, according to the design of the car construction.

With such objects in view, and others which will appear as the description proceeds, the invention comprises various novel features of construction and arrangement of parts which will be set forth with particularity in the following description and claims appended hereto.

Figure 1:
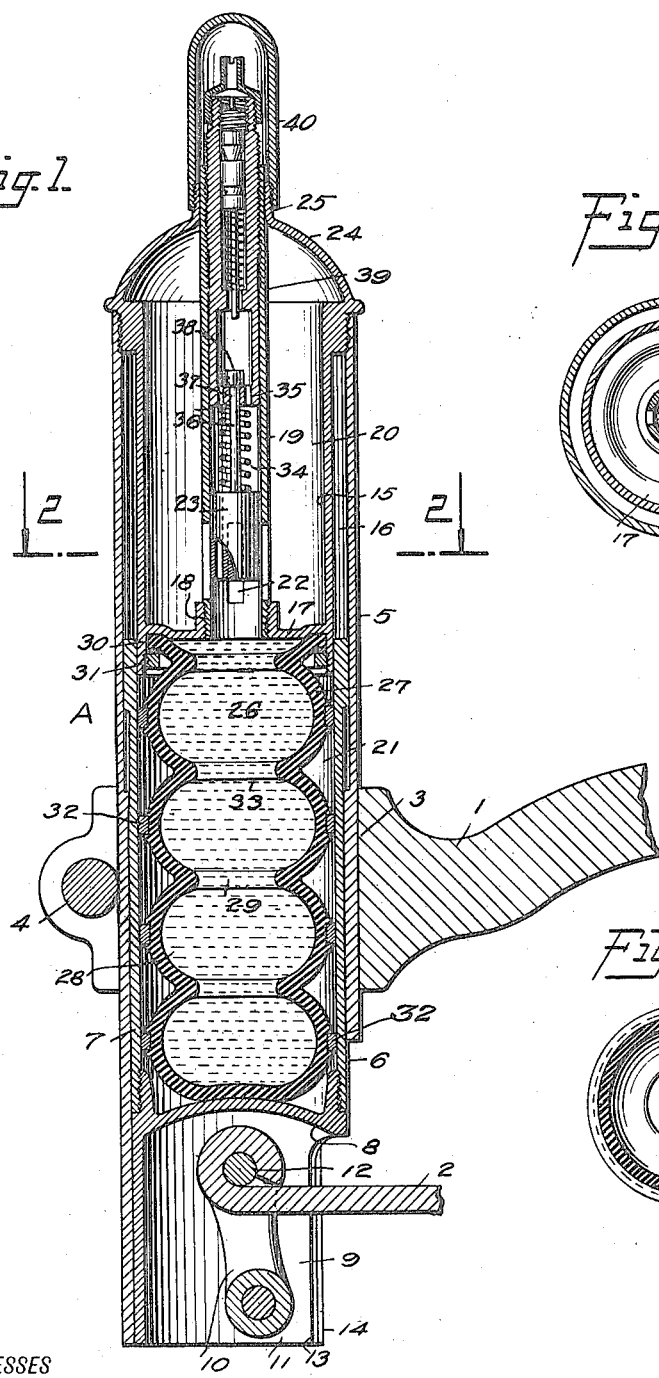
Figure 2:
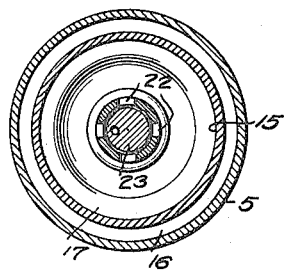
Figure 3:
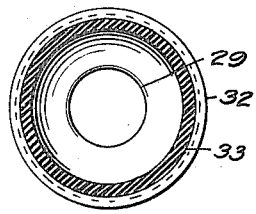

In the accompanying drawing, which illustrates one embodiment of the invention and wherein similar characters of reference indicate corresponding parts in all the views, Figure 1 is a central vertical section of the shock absorber; Fig. 2 is a horizontal section on the line 2—2, Fig. 1; and Fig. 3 is a section through one of the cells of the liquid-containing sack.

Referring to the drawing, 1 designates one of the brackets, hangers or arms attached to a vehicle body, and 2 is a leaf of a body supporting spring, and between these two elements is the shock absorber A, which is of cylindrical form and mounted vertically in the arm 1, which has a split opening or eye 3 in which the shock absorber is vertically adjustable and clamped by a bolt or equivalent device 4 when in the desired position of adjustment.

The shock absorber comprises a cylindrical body section 5 in which reciprocates a hollow cylindrical plunger 6 formed by a piece of tubing 7 which has a working fit in the body 5, and the lower end of the tube 7 has screwed thereinto a head 8 that is formed with a depending extension 9. This extension houses a shackle 10 which has its lower end connected by a pivot 11 with the plunger and its upper end is pivotally connected at 12 with the spring 2, the spring extending into registering vertical slots 13 and 14. The upper end of the casing or body 5 is provided with a cylinder 15 which has an external diameter somewhat smaller than the internal diameter of the body 5, so as to provide an annular pocket 16 into which the upper end of the plunger 6 slides. This cylinder, which is screwed into the casing 5, has a horizontal partition 17 set inwardly from its lower end, and this partition is provided with an internally threaded boss 18 into which is screwed a valve guiding tube 19. This partition divides the casing into two upper and lower chambers 20 and 21, for holding respectively air and liquid, and these chambers communicate through ports 22 in the tube 19, and the ports are controlled by a slide valve 23.

The cylinder 15 has a cover 24 that is provided with a central opening or neck 25 in which the upper end of the tube 19 fits.

The liquid 26 is preferably contained in a rubber or other flexible sack 27 which consists of a plurality of approximately spherical cells 27 arranged in coaxial alinement and communicating through contracted portions or necks 29. The bottom of the sack or container 28 is closed and rests on the bottom of the plunger or follower 6, and the upper open end has its circumferential marginal portion or edge 30 extending into the bottom of the cylinder 15 and is clamped against the partition 17 by a clamping ring 31 threaded into the lower end of the cylinder 15. In order to prevent the sack from expanding or coming into binding contact with the cylinder 7 of the plunger 6, each cell has an equatorial metallic ring 32 set into an annular circumferential groove 33, such ring having an external diameter substantially the same as the internal diameter of the plunger so as to freely slide longitudinally thereof. The sack is compressible and extensible longitudinally during the relative movement of the body and vehicle wheels when the shock is imparted to the latter, and as the sack contracts liquid is forced out of the same into the bottom of the compressed air chamber 20, the entrance to the latter being had through the valve-controlled ports 22. The valve 23 is forced upwardly by the liquid acting on the bottom thereof and uncovers more or less of the ports, but this pressure on the valve is opposed by a helical spring 34 which is disposed in the guide tube 19 and interposed between the top of the valve 23 and an adjustable abutment 35. The liquid passes freely into the chamber 20, but its return from the latter is retarded by the valve 23 operating to close the ports 22 to a greater or less extent, so that the recoil of the shock is absorbed. The valve 23 has a stem 36 which passes through an opening 37 in the abutment 35, and on the stem is a head 38 for limiting the downward or closing movement of the valve 23. This abutment 35 is carried by the lower end of a pneumatic valve 39 which is fitted in the upper end of the guide tube 19, and by screwing this valve device 39 inwardly or outwardly the valve 23 can be adjusted. The valve device 39 is similar to the valve in a pneumatic tire, so that its construction need not be set forth. The valve device extends out of the top of the shock absorber and is protected by a removable cap 40, and by means of this valve device pneumatic pressure can be established in the chamber 20, the air passing through the device 39 into the space above the valve 23, through said valve, through the ports 22 and into the chamber 20.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A shock absorber comprising relatively movable elements, an air chamber, a liquid-containing flexible sack, a valve-controlled communicating means between the sack and chamber, whereby liquid can pass freely into the latter and retardedly therefrom, said sack being longitudinally compressible, and means surrounding the sack for preventing the same from expanding into binding frictional contact with the surrounding wall of the device.

2. A shock absorber comprising an air-containing chamber, a liquid-containing chamber relatively movable with respect to the air-containing chamber, a valve-controlled port between the chambers, a sack in the second chamber for holding the liquid, said sack having an open end communicable with the air chamber through the port, whereby liquid can pass from the sack to the air chamber, and vice versa, and means for preventing the sack from expanding into contact with the second-mentioned chamber when the sack is compressed by the relative movement of the chambers.

3. A shock absorber comprising an air-containing chamber, a liquid-containing chamber relatively movable with respect to the air-containing chamber, a valve-controlled port between the chambers, a sack in the second chamber for holding the liquid, said sack having an open end communicable with the air chamber through the port, whereby liquid can pass from the sack to the air chamber, and vice versa, said sack consisting of axial alining approximately spherical cells, and a ring surrouding each cell for maintaining the same out of binding contact with the surrounding wall of the sack-containing chamber.

4. A shock absorber comprising an air chamber, a liquid-containing chamber relatively movable with respect to the air-containing chamber, a tube extending through the air chamber and having a ported end through which the two chambers communicate, a valve in the ported end of the tube for controlling communication between the chambers, a hollow element threaded in the tube, a spring interposed between the valve and element whereby the latter adjusts the tension of the spring, and an air-admitting valve disposed in the said element, whereby air under pressure can be introduced into the air-containing chamber.

5. A shock absorber comprising an air chamber, a liquid-containing chamber relatively movable with respect to the air-containing chamber, a tube extending through the air chamber and having a ported end through which the two chambers communicate, a valve in the ported end of the tube for controlling communication between the chambers, a hollow element threaded in the tube, a spring interposed between the valve and element whereby the latter adjusts the tension of the spring, an air-admitting valve disposed in the said element, whereby air under pressure can be introduced into the air-containing chamber, and a stem connected with the first mentioned valve and movably attached to the said element, whereby the latter and valve are insertible or removable from the tube as a unit, and the said stem serving to hold the spring in place.

6. A shock absorber comprising a cylindrical casing, a cylinder secured to the casing and disposed within the same, said inner cylinder having heads, a tube extending from one head to the other and provided with ports, means for supplying air under pressure to the inner cylinder, a cylindrical plunger in the first-mentioned cylinder and telescoped over the inner cylinder, liquid in the plunger adapted to be forced into the inner cylinder, and valve-controlled ports in the said tube for controlling the passage of fluid to and from the said chamber.

7. A shock absorber comprising a casing, a chamber therein for containing air under pressure, a cylindrical plunger slidably mounted in the casing, a tube extending axially of the chamber, an air supply valve device adjustably mounted in the tube, ports in the tube, a valve slidable in the tube and controlling the said ports, a spring tending to close the valve, and liquid in the plunger to coöperate with the pressure of the air in the chamber for absorbing shocks between the plunger and casing.

8. A shock absorber comprising a cylindrical casing, a hollow plunger in the bottom thereof, a cellular flexible liquid-containing sack disposed in the plunger and having its bottom closed and its top open, an air chamber in the top of the casing, a tube extending longitudinally of the chamber and having its lower end communicating with the sack and provided with a port communicating with the chamber, a valve disposed in the tube for controlling the port, whereby liquid can pass into and out of the chamber, an air valve device threaded in the tube, means for suspending the valve on the said device, and a spring interposed between the valve and said device, whereby the latter serves to adjust the tension of the spring.

9. A shock absorber comprising a casing, a hollow plunger slidably mounted in the casing and having one end closed and the other end open, a flexible sack in the plunger and longitudinally compressible, means for preventing transverse expansion of the sack, a cylindrical air-containing chamber in the casing, an annular flange carried by the chamber and into which the open end of the sack extends, means engaged with the flange for clamping the sack liquid-tight to the wall of the chamber, and a valve-controlled communicating means between the open end of the sack and the interior of the chamber.

In testimony whereof I have signed my name to this specification in the presence of two subscribing witnesses.

BENJAMIN JAMES DRYER.

Witnesses:
E. J. CAREY,
FRANCIS X. J. O'NEILL.